H. Beagle, Jr.,

Back Band Hook.

No. 109,572.  Patented Nov. 29, 1870.

Witnesses:
A. W. Almquist
L. J. Mabee

Inventor:
H. Beagle, Jr.
per
Attorneys.

United States Patent Office.

HENRY BEAGLE, JR., OF PHILADELPHIA, PENNSYLVANIA.

Letters Patent No. 109,572, dated November 29, 1870.

IMPROVEMENT IN BACKBAND-HOOKS.

The Schedule referred to in these Letters Patent and making part of the same.

*To all whom it may concern:*

Be it known that I, HENRY BEAGLE, Jr., of Philadelphia, in the county of Philadelphia and State of Pennsylvania, have invented a new and useful Improvement in Backband-Hook; and I do hereby declare that the following is a full, clear, and exact description thereof, which will enable others skilled in the art to make and use the same, reference being had to the accompanying drawing forming part of this specification, in which—

Figure 3 is a side view, partly in section, of a modified form of the same.

Similar letters of reference indicate corresponding parts.

My invention has for its object to furnish a simple, cheap, strong, and durable backstrap-hook, which shall be so constructed that it can be easily and conveniently attached to the backstrap, and which will keep the traces from getting out of the hook, and will not catch upon the harness of the other horse; and It consists in the backband-hook constructed as hereinafter more fully described.

A represents a portion of a backband which may be made of a leather strap or a piece of webbing, or any other suitable material.

Figure 1:
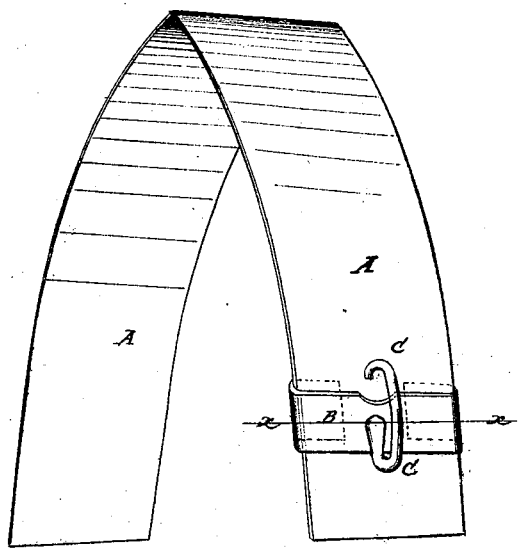
Figure 1 is a perspective view of my improved backband-hook, as attached to a backband.
Figure 2:
Figure 2 is a detail sectional view of the same taken through the line x x, fig. 1.
Figure 2:

B C is the hook, the part B of which is made of hoop or band-iron, having its ends bent over upon itself, as shown in fig. 2 and in dotted lines in fig. 1, to receive the edges of the backband A, so that the said hook may be secured to the said backband by closing down the ends of the said iron B upon the said backband A.

C is the hook or loop that receives the trace, one end of which is securely riveted to the part B. The hook C may be bent downward, outward, and upward, and its extreme end bent inward close to the backband A, as shown in fig. 1. Or it may be bent downward, inward, and upward, so as to be close to the backstrap, its extreme end being left straight or bent outward slightly, as shown in fig. 3.

The exact form of the hook C is immaterial so long as a sufficient loop is formed for the trace, and so long as the point or free end of the said hook is so arranged with reference to the backband A that the trace cannot work out and the point of the hook cannot catch upon the harness of the other horse.

Having thus described my invention,

I claim as new and desire to secure by Letters Patent—

A backband-hook formed of band-iron B, having its ends bent over upon itself, and a trace-hook, C, bent inwardly at the point, both riveted together, for the purpose specified.

HENRY BEAGLE, JR.

Witnesses:
PETER HAY,
THOMAS BEAGLE.